United States Patent [19]
Tsuzuki et al.

[11] Patent Number: 4,790,426
[45] Date of Patent: Dec. 13, 1988

[54] TRANSFER APPARATUS

[75] Inventors: Sadaaki Tsuzuki; Satoru Uemura, both of Kariya, Japan

[73] Assignee: Toyoda Koki Kabushiki Kaisha, Kariya, Japan

[21] Appl. No.: 79,400

[22] Filed: Jul. 30, 1987

[30] Foreign Application Priority Data

Aug. 5, 1986 [JP] Japan ................................ 61-184036
Aug. 12, 1986 [JP] Japan ................................ 61-187702

[51] Int. Cl.⁴ ............................................. B65G 25/00
[52] U.S. Cl. ..................................... 198/741; 198/747; 414/749; 74/89.15; 74/110
[58] Field of Search ............... 198/461, 736, 738, 739, 198/741, 747; 414/744 R, 749, 750, 751, 752, 753; 74/422, 89.17, 89.15, 110; 901/16

[56] References Cited

U.S. PATENT DOCUMENTS

| | | | |
|---|---|---|---|
| 3,361,250 | 1/1968 | Pierce et al. | 198/741 |
| 3,892,137 | 7/1975 | Menzel | 74/99 R |
| 4,018,328 | 4/1977 | Galarowic et al. | 198/747 X |
| 4,306,401 | 12/1981 | Stohlquist et al. | 198/741 X |
| 4,474,284 | 10/1984 | Powell et al. | 198/741 X |
| 4,557,156 | 12/1985 | Teramachi | 74/89.15 X |
| 4,600,358 | 7/1986 | Graf | 901/16 X |

FOREIGN PATENT DOCUMENTS

| | | |
|---|---|---|
| 51-33016 | 8/1976 | Japan . |
| 58-28068 | 6/1983 | Japan . |
| 60-21152 | 6/1985 | Japan . |
| 60-37242 | 11/1985 | Japan . |
| 61-6040 | 2/1986 | Japan . |

*Primary Examiner*—Robert J. Spar
*Assistant Examiner*—Lyle Kimm
*Attorney, Agent, or Firm*—Oblon, Fisher, Spivak, McClelland & Maier

[57] ABSTRACT

A transfer apparatus which is designed to transfer workpieces at different pitches by a plurality of transfer bars. The apparatus has a horizontal guide provided on a frame which supports first and second transfer bars in such a manner that these transfer bars are movable axially in the horizontal direction, and at least one slider block is slidably guided in parallel to the transfer bars through the guide. This slider block is provided with a driving motor and further provided with a mechanism which is arranged to allow the slider block to slide along the guide by the rotational force derived from the motor. An arm which is pivoted by the rotational force from the motor is pivotally supported on the slider block. Further, a first and second transmission are provided for transmitting the movements of the slider block and the arm to the first and second transfer bars, respectively. According to this arrangement, the first transfer bar, together with the slider block, is moved axially in the horizontal direction, and the second transfer bar is moved axially in the horizontal direction more than the slider block by an amount corresponding to the amount of pivotal movement of the arm. Thus, the first and second transfer bars can be moved at different strokes.

10 Claims, 5 Drawing Sheets

TRANSFER APPARATUS

BACKGROUND OF THE INVENTION

1. Field of the Invention

The present invention relates to a transfer apparatus designed to transfer workpieces at different pitches by means of a plurality of transfer bars.

2. Discussion of the Prior Art

In transfer machines, generally, a plurality of working stations are disposed in series along the production line in such a manner that the stations are spaced apart from each other, and workpieces are successively transferred from one working station to another by means of a transfer apparatus. There has heretofore been one type of transfer apparatus known as two-pitch transfer apparatus in which each pair of working stations are provided in close proximity with each other and workpieces are transferred from one working station to the other at two different transfer pitches for the purpose of reducing the floor area required for installation of the transfer machine.

If the arrangement is such that a plurality of transfer bars are moved at different pitches by means of a known mechanical transfer apparatus that utilizes a driving motor as a drive source, the overall size of the transfer apparatus is considerably increased, resulting disadvantageously in an increase in the floor area occupied by the apparatus.

The above-described problem experienced with the conventional mechanical transfer apparatus in attributable to its arrangement. More specifically, in this prior art, a gear box having a driving motor installed therein and a guide means which slidably supports a slider block having a transfer bar connected thereto are installed separately and independently of each other. The gear box supports a driving arm which is pivoted by means of the driving motor through a reduction gear mechanism, and a roller is rotatably supported at the distal end of the driving arm. The roller is engaged with a vertical groove formed in the slider block, so that the slider block is reciprocated at a predetermined stroke in response to the pivotal motion of the driving arm.

SUMMARY OF THE INVENTION

Accordingly, it is a primary object of the present invention to provide a multi-pitch transfer apparatus which is so designed that it is possible to minimize the space for installation of a drive unit for driving a slider that moves a transfer bar in the axial direction and which is simple in design and reliable in operation.

It is another object of the present invention to provide a transfer apparatus which enables three transfer bars to be moved at different pitches by additionally providing a simple mechanism.

In brief, in the transfer apparatus according to the present invention, a horizontal guide means is provided on a frame which supports first and second transfer bars in such a manner that these transfer bars are movable axially in the horizontal direction, and at least one slider block is slidably guided in parallel to the transfer bars through the guide means. This slider block is provided with a driving motor and further provided with a mechanism which is arranged to allow the slider block to slide along the guide means by means of the rotational force derived from the motor. An arm means which is pivoted by means of the rotational force from the motor is pivotally supported on the slider block. Further, first and second transmission means are provided for transmitting the movements of the slider block and the arm means to the first and second transfer bars, respectively.

According to this arrangement, the first transfer bar, together with the slider block, is moved axially in the horizontal direction, and the second transfer bar is moved axially in the horizontal direction more than the slider block by an amount corresponding to the amount of pivotal movement of the arm means. Thus, the first and second transfer bars can be moved at different strokes. Further, since the driving motor is provided on the slider block, the size of the slider block moving mechanism is reduced, so that it is possible to reduce the space required for installation of the whole system.

BRIEF DESCRIPTION OF THE ACCOMPANYING DRAWINGS

The above and other objects, features and advantages of the present invention will become more apparent from the following description of the preferred embodiments thereof, taken in conjunction with the accompanying drawings, in which like reference numerals denote like members, and of which:

DESCRIPTION OF THE PREFERRED EMBODIMENTS

Figure 1:
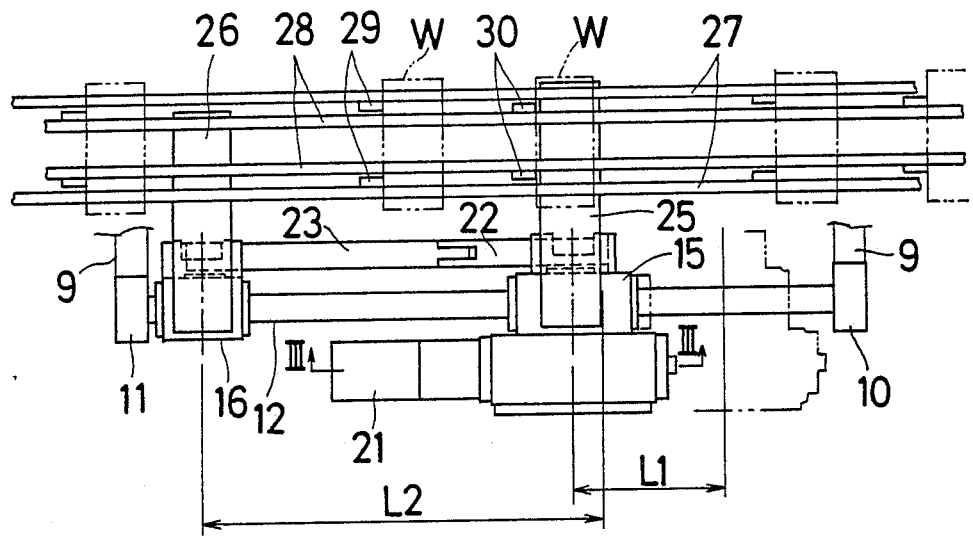
FIG. 1 is a fragmentary plan view of a first embodiment of the transfer apparatus according to the present invention.
Figure 2:
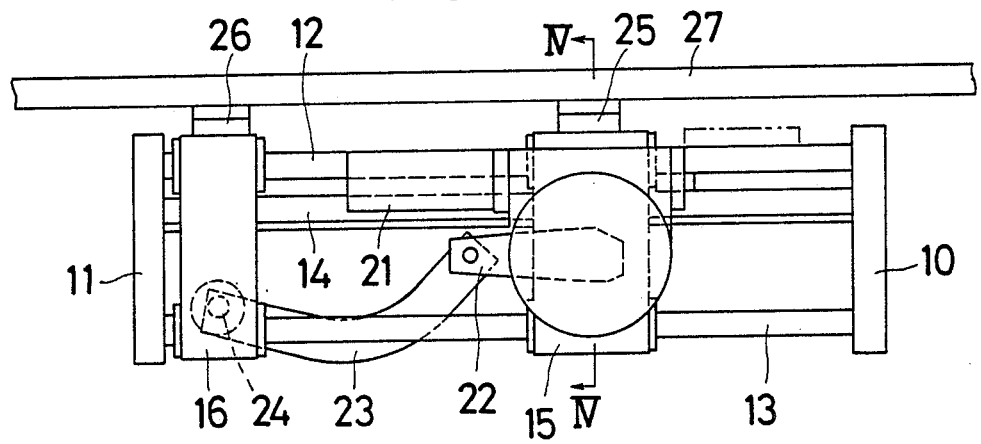
FIG. 2 is a front view of the first embodiment.

Referring first to FIGS. 1 and 2, which shows a first embodiment of the transfer apparatus according to the present invention, reference numerals 10 and 11 denote fixed blocks which are secured to a frame 9 in such a manner that the blocks 10 and 11 are spaced apart from each other at a predetermined distance in the direction of transfer. A pair of guide bars 12 and 13 and a fixed rack 14 are rigidly supported between the fixed blocks 10 and 11 in such a manner that the guide bars 12, 13 and the fixed rack 14 extend horizontally. Two slider blocks 15 and 16 are slidably supported on the pair of guide bars 12 and 13.

Figure 4:
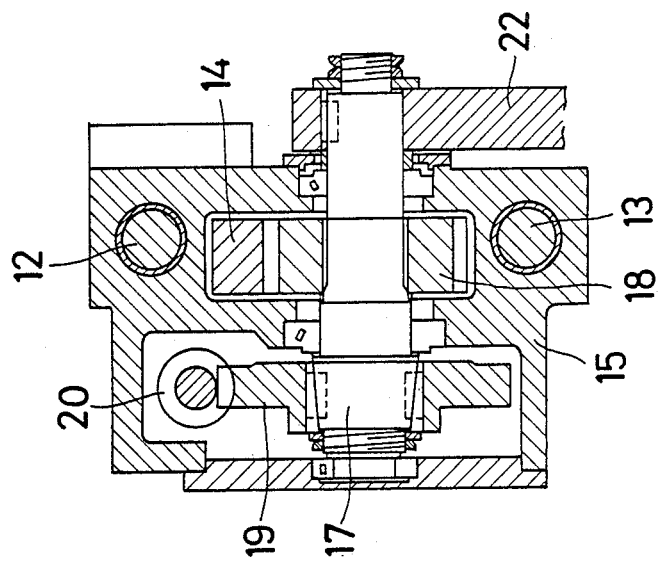
FIG. 4 is a sectional view taken along the line IV—IV of FIG. 2.
Figure 3:
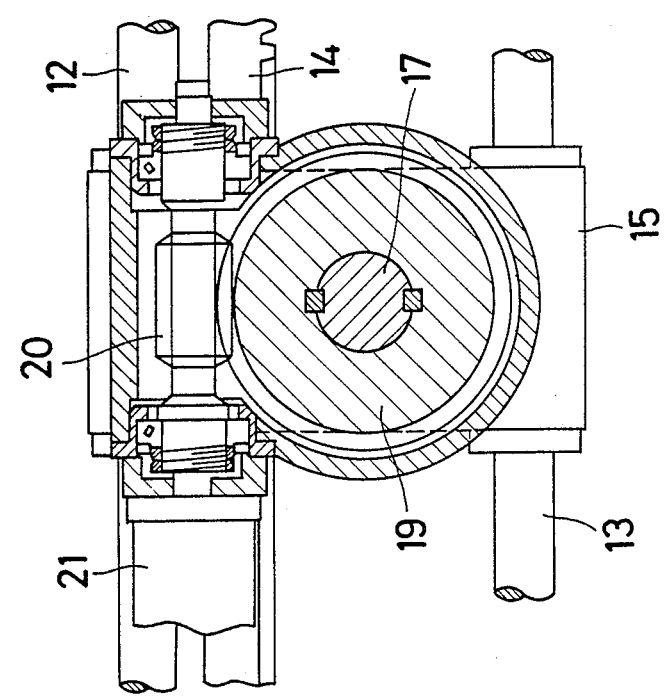
FIG. 3 is a sectional view taken along the line III—III of FIG. 1.

As shown in FIGS. 3 and 4, a driving shaft 17 is carried on one slider block 15 in such a manner that the shaft 17 is rotatable around the horizontal axis which is perpendicular to the guide bars 12 and 13. A pinion 18 which is meshed with the fixed rack 14 is secured to the driving shaft 17 by means of spline fitting. A worm wheel 19 is keyed on one end of the driving shaft 17, and a worm 20 which is meshed with the worm wheel 19 is rotatably carried on the slider block 15. The worm 20 is connected to a driving motor 21 which is installed on the slider block 15 so that the rotation of the motor 21 is transmitted to the driving shaft 17 after the speed thereof has been reduced. One end of a connecting arm 22 is connected to the other end of the driving shaft 17, and one end of a link 23 is rotatably connected to the other end of the connecting arm 22 as shown in FIG. 1 and 2. The other end of the link 23 is connected to the other slider block 16 through a pivot shaft 24.

Connecting brackets 25 and 26 are rigidly secured to the slider blocks 15 and 16, respectively. To these connecing brackets 25 and 26 are respectively connected two different kinds of transfer bars 27 and 28 which are adapted to transfer workpieces W at strokes L1 and L2 which are different from each other. The transfer bars 27 and 28 are slidably supported on the frame 9 so as to extend in parallel with the guide bars 12 and 13. The transfer bars 27 and 28 are provided with a plurality of transfer engagement members 29 and 30 which are disposed at pitches corresponding to the strokes L1 and L2, respectively.

The transfer operation conducted by the apparatus arranged as detailed above will next be described.

To transfer workpieces W, the driving motor 21 is first started forwardly. As a consequence, the forward rotation of the motor 21 causes the driving shaft 17 to rotate through the worm 20 and the worm wheel 19, and the pinion 18 which is in mesh with the fixed rack 14 is also rotated together with the shaft 17 in one unit. The rotation of the pinion 18 causes one slider block 15 to slide along the guide bars 12 and 13, thus causing the first transfer bars 27 to slide together with the slider block 15 in one unit.

The slide movement of the slider block 15 also causes the other slider block 16 to slide through the connecting arm 22 and the link 23. At this time, the connecting arm 22 is pivoted by means of the rotation of the driving shaft 17, and the pivotal movement of the connecting arm 22 also causes the slider block 16 to slide, resulting in the slider block 16 being moved more than the slider block 15 by an amount corresponding to the stroke given by the pivotal movement of the arm 22. In this manner, when the driving shaft 17 is rotated through a predetermined angle and one slider block 15 is thereby moved through the stroke L1, the other slider block 16 is moved through the stroke L2 which is greater than the stroke L1.

Accordingly, the workpieces W, which are engaged with the transfer engagement members 29 and 30 of the first and second transfer bars 27 and 28 connected to the slider blocks 15 and 16 through the connecting brackets 25 and 26, are also simultaneously moved by the strokes L1 and L2 and thus fed to the respective working stations.

It should be noted that, during working of the workpieces W, the driving motor 21 is reversed in order to return the transfer bars 27 and 28, and the driving shaft 17 is thereby rotated through the same angle as the above but in the opposite direction to the above, thus the transfer bars 27 and 28 being moved backward by the strokes L1 and L2. At this time, the transfer engagement members 29 and 30 provided on the transfer bars 27 and 28 are forced to withdraw from the upper surfaces of the transfer bars 27 and 28 by the lower surfaces of the workpieces W and, after passing the workpieces W, the engagement members 29 and 30 are raised by means of the resilient force from springs to the position where they are engageable with subsequent workpieces W.

Figure 5:
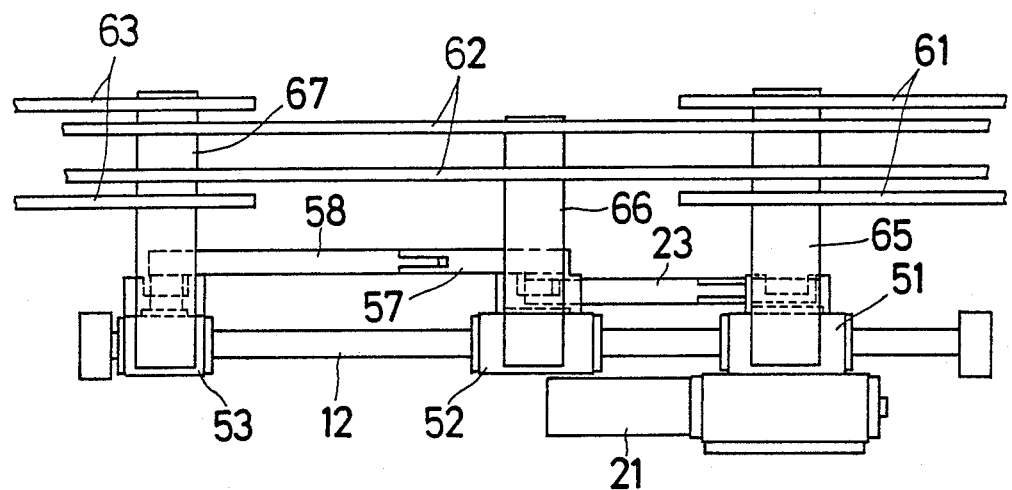
FIG. 5 is a fragmentary plan view of a second embodiment of the transfer apparatus according to the present invention.
Figure 6:
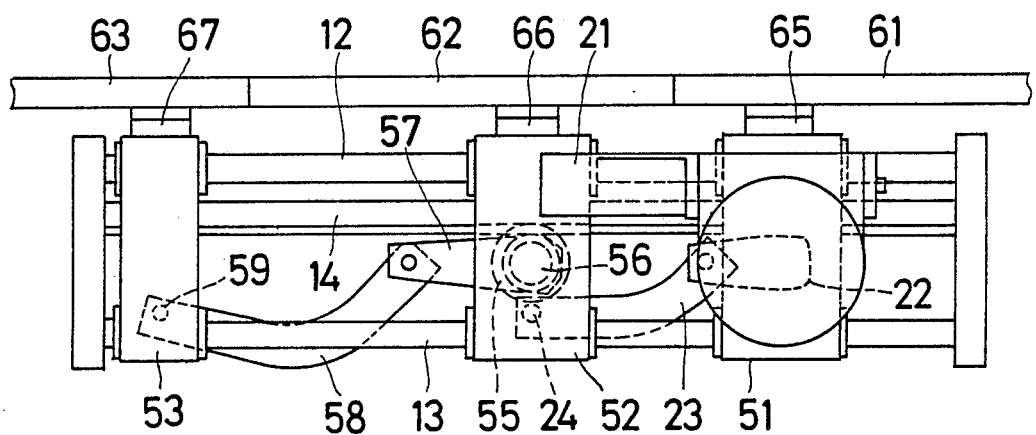
FIG. 6 is a front view of the second embodiment.
Figure 7:
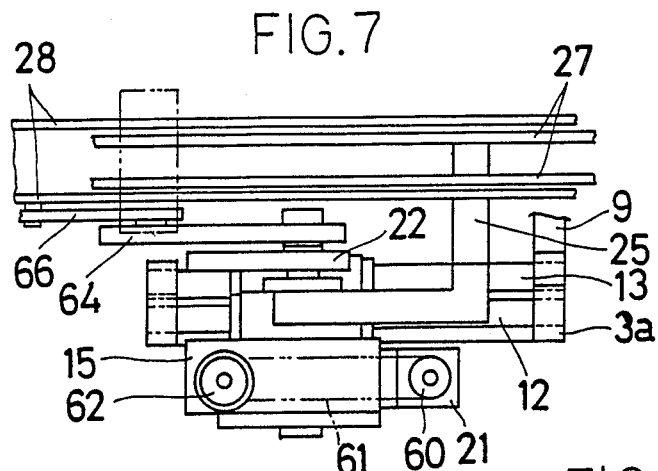
FIG. 7 is a plan view of a third embodiment of the transfer apparatus according to the present invention.
Figure 8:
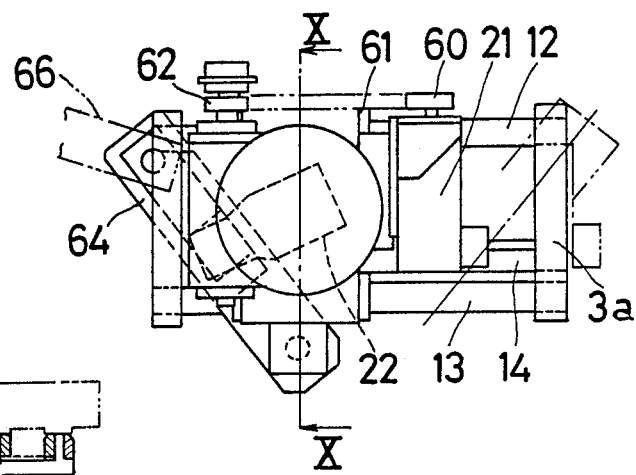
FIG. 8 is a front view of the third embodiment.
Figure 9:
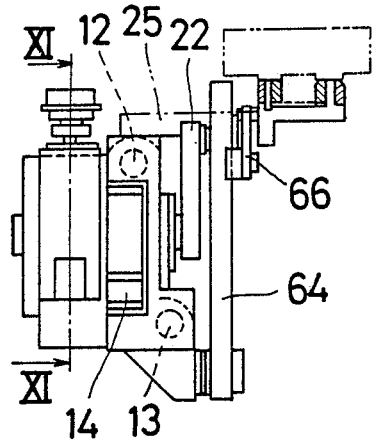
FIG. 9 is a side view of the third embodiment.
Figure 10:
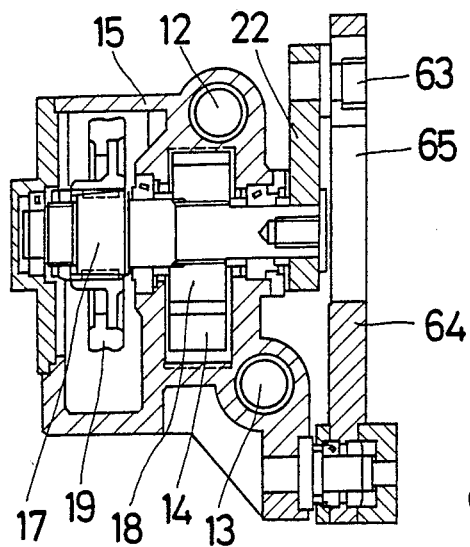
FIG. 10 is a sectional view taken along the line X—X of FIG. 8.
Figure 11:
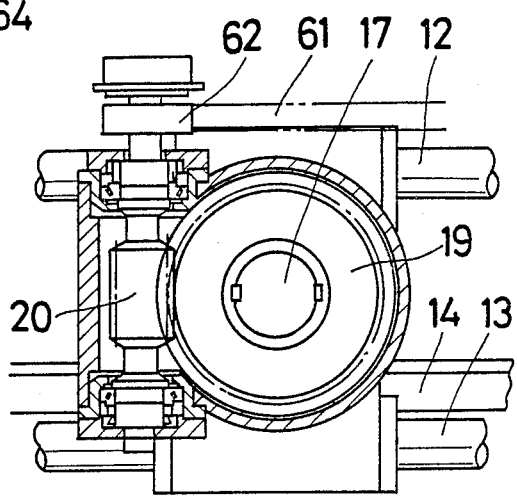
FIG. 11 is a sectional view taken along the line XI—XI of FIG. 9.

FIGS. 5 and 6 show in combination a second embodiment of the present invention which is arranged so that workpieces W are transferred at three different pitches.

More specifically, as shown in the figures, three slider blocks 51, 52 and 53 are slidably supported on the guide bars 12 and 13. The first slider block 51 is arranged in the same way as one slider block 15 in the above-described first embodiment and is therefore moved along the guide bars 12 and 13 by means of the rotation of the driving motor 21. The connecting arm 22 which is connected at one end thereof to the first slider block 51 is connected at the other end to the link 23 which is in turn connected at the other end thereof to the second or intermediate slider block 52 through the pivot shaft 24. The second slider block 52 rotatably supports a rotary shaft 56 to which is secured a pinion 55 that is meshed with the fixed rack 14, and a connecting arm 57 is secured to one end of the rotary shaft 56. A link 58 is connected to the other end of the connecting arm 57, and the other end of the link 58 is connected to the third slider block 53 through a pivot shaft 59. Transfer bars 61, 62 and 63 are connected to the first, second and third slider blocks 51, 52 and 53 through connecting brackets 65, 66 and 67, respectively.

In the second embodiment, when the driving motor 21 is rotated forwardly, the driving shaft 17 is rotated, and the first slider block 51 is moved by means of the rotation of the pinion 18 which is in mesh with the fixed rack 14 in the same manner as in the first embodiment. The second slider block 52 is moved through a distance corresponding to a stroke which is greater than the stroke of the first slider block 51 by means of the composite movement consisting of the slide movement of the first slider block 51 and the pivotal movement of the connecting arm 22 caused by the rotation of the driving shaft 17.

The slide movement of the second slider block 52 causes rotation of the pinion 55 which is in mesh with the fixed rack 14, and the rotary shaft 56 is thereby rotated, causing the connecting arm 57 secured to the shaft 56 to pivot. Consequently, the third slider block 53 is moved by means of the composite movement consisting of the slide movement of the second slider block 52 and the pivotal movement of the connecting arm 57. At this time, the difference in terms of stroke between the second and third slider blocks 52 and 53 can be set as desired on the basis of the difference in terms of the radius of rotation between the connecting arms 22 and 57 of the first and second slider blocks 51 and 52 or the difference in diameter between the pinions 18 and 55 of the slider blocks 51 and 52.

FIGS. 7 to 12 show in combination a third embodiment which may be employed in place of the above-described first embodiment. The feature of the third embodiment resides in that the second slider block 16 in the first embodiment is eliminated in this embodiment. In the third embodiment described hereinunder in detail, members having functions which are identical or corresponding to those of the members in the first embodiment are denoted by the same reference numerals.

In the third embodiment, the rotation of the driving motor 21 which is provided on the first slider block 15 is transmitted to the worm 20 through a driving pulley 60, a belt 61 and a driven pulley 61. A roller 63 is supported at the free end of the connecting arm 22 which is rigidly secured to the other end of the driving shaft 17. One end of a pivoting arm 64 is attached to the lower portion of the rear side of the first slider block 15 in such a manner that the arm 64 is pivotal within a vertical plane, and a slot 65 for guiding the roller 63 is formed in the arm 64 on the side thereof which is closer to its free end. The first slider block 15 is integrally connected to the first transfer bars 27 through the bracket 25, and the free end of the pivoting arm 64 is coupled to the second transfer bars 28 through a link 66. More specifically, one end of the link 66 is pivotally connected to the free end side of the arm 64, while the other end of the link 66 is pivotally connected to the second transfer bars 28.

Figure 12:
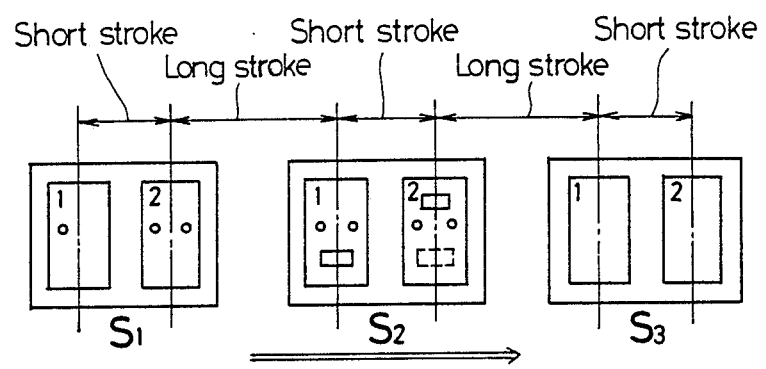
FIG. 12 shows the transfer operation conducted by the third embodiment.

Accordingly, when the worm 20 rotates, the pinion 18 rolls on the fixed rack 14, causing the first slider block 15 to move. At the same time, the pivoting arm 64 is pivoted by the crank motion of the connecting arm 22. As a result, the first transfer bars 27 are moved axially in the horizontal direction together with the first slider block 15 in one unit, while the second transfer bars 28 are moved in the same direction by the action of the pivoting arm 64 through the link 66. As shown in FIG. 12, the second transfer bars 28 transfer a workpiece W from the second working position in each working station $S_n$ to the first working position in the subsequent working station $S_{n+1}$, while the first transfer bars 27 transfer a workpiece W from the first working position in each working station $S_n$ to the second working position in the same working station $S_n$.

Obviously, numerous modifications and variations of the present invention are possible in light of the above teachings. It is therefore to be understood that within the scope of the appended claims, the present invention may be practiced otherwise than as specifically described herein.

What is claimed is:

1. A transfer apparatus designed to transfer workpieces at different pitches by means of a plurality of transfer bars, comprising:
    a frame;
    first and second transfer bars supported on said frame in said a manner as to be movable axially in the horizontal direction;
    guide means provided on said frame so as to extend in parallel to said first and second transfer bars;
    a first slider block supported on said guide means in such a manner as to be movable horizontally;
    a driving motor provided on said slider block;
    advancing means for sliding said slider block along said guide means by means of the rotational output of said driving motor;
    arm means rotatably supported on said slider block and rotated by means of the rotational output of said driving motor; and
    first and second transmission means for transmitting the movements of said slider block and said arm means to said first and second transfer bars, respectively whereby said first transfer bar has different pitch of movement than the pitch of movement of said second transfer bar.

2. A transfer apparatus according to claim 1, wherein said advancing means comprising:
    a driving shaft extending perpendicularly to said first and second transfer bars and rotatably supported by said slider block;
    power transmission means for transmitting the rotation of said driving motor to said driving shaft;
    a pinion rigidly secured to said driving shaft; and
    a rack bar rigidly secured to said frame and meshed with said pinion,
    said arm means including a crank arm rigidly secured to said driving shaft.

3. A transfer apparatus according to claim 1, wherein said second transmission means comprising:
    a second slider block slidably supported on said guide means;
    a link connected at one end thereof to said arm means and pivotally connected at the other end thereof to said second slider block; and
    a connecting member for connecting said second slider block to said second transfer bar together in one unit.

4. A transfer apparatus according to claim 3, further comprising:
    a third transfer bar extending in the same direction as said first and second transfer bars and supported on said frame in such a manner as to be movable axially in the horizontal direction;
    a third slider block slidably supported on said guide means;
    means for connecting said third slider block to said third transfer bar together in one unit; and
    third transmission means for transmitting the slide movement of said second slider block to said third slider block whereby said third transfer bar has a different ptich of movement than the pitches of movement of said first and second bars.

5. A transfer apparatus according to claim 4, wherein said advancing means comprising:
    a driving shaft extending perpendicularly to said first, second and third transfer bars and rotatably supported by said first slider block;
    rotation transmission means for transmitting the rotation of said driving motor to said driving shaft;
    a pinion rigidly secured to said driving shaft; and
    a rack bar rigidly secured to said frame and meshed with said pinion,
    said arm means including a crank arm rigidly secured to said driving shaft.

6. A transfer apparatus according to claim 5, wherein said third transmission means comprising:
    a pinion rotatably supported on said second slider block and meshed with said rack bar;
    a second arm rotated in conjunction with said pinion; and
    a second link pivotally connected at one end thereof to the free end of said second arm and pivotally connected at the other end thereof to said third slider block.

7. A transfer apparatus according to claim 2, wherein sadi arm means further includes:
    a pivoting arm carried by said at least one slide block through a pivot shaft extending in parallel relation with said driving shaft;
    motion translating means interposed between said crank arm and said pivoting arm for translating a crank motion of said crank arm to a rocking motion of said pivoting arm within a limited angular range; and
    a link pivotably connected to said pivoting arm at one end and to said second transmission means for axially moving said second transfer bar upon said rocking motion of said pivoting arm.

8. A transfer apparatus according to claim 7, wherein said motion translating means comprises:

a slot formed in said pivoting arm in a longitudinal direction thereof; and a sliding member pivotably carried by a free end of said crank arm and slidable within said slot of said pivoting arm.

9. A transfer apparatus according to claim 1, wherein:

said first and second transfer bars extend in side-by-side relation with each other;

a plurality of working stations, each having first and second working positions spaced in the longtudinal direction of said first and second transfer bars, which are provided at regular intervals along said first and second transfer bars wherein one of said first and second transfer bars is movable to transfer said workpieces from said first working position at each of said working stations to said second working position at the same working station, while the other of said first and second transfer bars is movable to transfer said workpieces from said second working position at each of said working stations to said first working position at the next working station.

10. A transfer apparatus according to claim 9, wherein:

said first transmission means comprises a bracket bodily connected to said slide block and said first transfer bar; and said second transmission means comprises a pivoting arm operatively connected to said second transfer bar and pivotably connected to said arm means.

* * * * *